US006254924B1

(12) United States Patent
Brorein et al.

(10) Patent No.: US 6,254,924 B1
(45) Date of Patent: Jul. 3, 2001

(54) PAIRED ELECTRICAL CABLE HAVING IMPROVED TRANSMISSION PROPERTIES AND METHOD FOR MAKING SAME

(75) Inventors: William Jacob Brorein, Whippany; Jeffrey Alan Poulsen, Long Branch, both of NJ (US); Timothy Berelsman, Delphos, OH (US); LaVern P. Rutkoski, Cass City, MI (US)

(73) Assignee: General Cable Technologies Corporation, Highland Heights, KY (US)

(*) Notice: Subject to any disclaimer, the term of this patent is extended or adjusted under 35 U.S.C. 154(b) by 0 days.

(21) Appl. No.: 09/003,942

(22) Filed: Jan. 8, 1998

Related U.S. Application Data

(62) Division of application No. 08/582,699, filed on Jan. 4, 1996, now Pat. No. 5,767,441.

(51) Int. Cl.[7] .............................. B05D 5/12; B32B 15/04; B32B 31/00; A23G 1/22

(52) U.S. Cl. ..................... 427/117; 427/178; 264/171.14; 264/171.15; 264/171.16; 264/171.2; 264/171.21; 425/113; 425/114; 425/131.1; 425/133.1

(58) Field of Search .................................... 427/117, 118, 427/120, 356, 434.6, 178; 264/171.14, 1, 171.16, 171.2, 171.21; 425/113, 114, 131.1, 133.1

(56) References Cited

U.S. PATENT DOCUMENTS

| | | | |
|---|---|---|---|
| 267,279 | 11/1882 | Strohm . | |
| 297,175 | 4/1884 | Shelbourne . | |
| 1,561,495 | 11/1925 | Thompson . | |
| 1,629,168 | 5/1927 | Massingham . | |
| 1,694,056 | 12/1928 | Calkins . | |
| 1,941,374 | 12/1933 | Weisberg | 173/361 |
| 1,987,772 | 1/1935 | Eberhardt | 173/332 |
| 2,002,558 | 5/1935 | Von Holtz | 173/328 |
| 2,026,755 | 1/1936 | Stem | 173/343 |
| 2,049,093 | 7/1936 | Thorin | 173/361 |
| 2,147,525 | 2/1939 | Ellis | 173/330 |

(List continued on next page.)

FOREIGN PATENT DOCUMENTS

| | | |
|---|---|---|
| 2702182 | 7/1978 | (DE) . |
| 147629B | 11/1980 | (DK) . |
| 0088264 | 9/1983 | (EP) . |
| 0171127 | 2/1986 | (EP) . |
| 0190500 | 8/1986 | (EP) . |
| 171127 * | 12/1986 | (EP) . |
| WO 8906041 | 6/1989 | (WO) . |

*Primary Examiner*—Brian K. Talbot
(74) *Attorney, Agent, or Firm*—Blank Rome Comisky & McCauley LLP

(57) ABSTRACT

A pre-twisted cable pair and a method for processing such pairs into an electrical cable having improved electrical and mechanical properties is disclosed. At least one insulated wire for transmitting electrical signals is pre-twisted prior to pairing with another insulated wire. As the pre-twisted wires are paired by a conventional double-twist machine which imparts back-twist, the detrimental electrical effects caused by irregularities in the individual wires are cycled over a very short distance, resulting in a cable pair having lower structural return loss, near-end crosstalk, and insertion loss than wires paired without any pre-twist. These pre-twisted wires may be united into a jacketed electrical cable by a continuous-extrusion jacketing process in which an optimal dielectric constant is maintained around each individual cable pair. This is made possible due to a unique die and tip configuration which provides ridges to space the pairs apart and provide optimum air dielectric, but prevents jacketing compound on the interior of the resulting electrical cable jacket from joining to isolate each individual cable pair during the extrusion process. The resultant electrical cable has superior electrical and mechanical properties when compared to similar electrical cables fabricated by conventional techniques.

11 Claims, 14 Drawing Sheets

U.S. PATENT DOCUMENTS

| | | | | |
|---|---|---|---|---|
| 2,166,621 | | 7/1939 | Budnick | 173/330 |
| 2,180,569 | | 11/1939 | Walls | 173/361 |
| 2,198,504 | | 4/1940 | Pool | 173/343 |
| 2,199,599 | | 5/1940 | Stambaugh | 173/330 |
| 2,213,020 | | 8/1940 | Scott | 173/332 |
| 2,215,316 | | 9/1940 | Benander | 173/330 |
| 2,261,615 | | 11/1941 | Cornwell | 173/361 |
| 2,262,272 | | 11/1941 | Eaton | 173/332 |
| 2,307,592 | | 1/1943 | Kuhlman | 173/328 |
| 2,408,551 | | 10/1946 | Frank | 173/343 |
| 2,423,250 | | 7/1947 | Modrey | 173/328 |
| 2,447,597 | | 8/1948 | Reed | 173/330 |
| 2,476,510 | | 7/1949 | Rosner | 173/361 |
| 2,479,234 | | 8/1949 | Hammerly et al. | 173/328 |
| 2,552,061 | | 5/1951 | Popp | 173/330 |
| 2,590,505 | | 3/1952 | Carlsen | 173/343 |
| 2,642,264 | | 6/1953 | Perry | 254/50.1 |
| 2,683,864 | | 7/1954 | Hubbell et al. | 339/14 |
| 2,704,831 | | 3/1955 | Smith | 339/91 |
| 2,732,531 | | 1/1956 | Janowiec | 339/75 |
| 2,771,590 | | 11/1956 | Nauslar | 339/168 |
| 2,787,653 | | 4/1957 | Ormerod | 174/117 |
| 2,799,009 | | 7/1957 | Benander | 339/75 |
| 2,801,394 | | 7/1957 | Derner et al. | 339/75 |
| 2,872,654 | | 2/1959 | Smith | 339/14 |
| 2,924,806 | | 2/1960 | Hubbell et al. | 339/91 |
| 2,946,037 | | 7/1960 | Platz et al. | 339/154 |
| 2,958,724 | | 11/1960 | Milloit | 174/88 |
| 3,052,079 | | 9/1962 | Henning | 57/34 |
| 3,066,276 | | 11/1962 | Hubbell et al. | 339/189 |
| 3,067,569 | | 12/1962 | Kelley | 57/139 |
| 3,206,709 | | 9/1965 | De Vore | 339/91 |
| 3,233,204 | | 2/1966 | De Vore | 339/45 |
| 3,345,603 | | 10/1967 | Cohen | 339/176 |
| 3,350,675 | | 10/1967 | Misencik et al. | 339/12 |
| 3,382,314 | | 5/1968 | Nordblad | 174/34 |
| 3,390,368 | | 6/1968 | Archer . | |
| 3,489,989 | | 1/1970 | Robaczewski | 339/75 |
| 3,543,218 | | 11/1970 | Archer | 339/74 |
| 3,611,255 | | 10/1971 | Shroyer | 339/60 R |
| 3,643,202 | | 2/1972 | Coon | 339/75 P |
| 3,668,607 | | 6/1972 | Farnworth | 339/41 |
| 3,676,576 | | 7/1972 | Dubernet et al. | 174/113 R |
| 3,691,327 | | 9/1972 | Chesler | 200/42 R |
| 3,710,304 | | 1/1973 | Warner et al. | 339/74 R |
| 3,775,726 | | 11/1973 | Gress | 339/14 R |
| 3,857,996 | | 12/1974 | Hansen et al. | 174/113 R |
| 3,890,025 | | 6/1975 | Gray | 339/14 P |
| 3,891,289 | | 6/1975 | Hanke | 339/14 P |
| 3,942,856 | | 3/1976 | Mindheim et al. | 339/74 R |
| 4,061,409 | | 12/1977 | Bealmear | 339/75 P |
| 4,095,991 | | 6/1978 | Falcoz et al. | 106/208 |
| 4,136,919 | | 1/1979 | Howard et al. | 339/75 P |
| 4,167,658 | | 9/1979 | Sherman | 200/44 |
| 4,172,106 | * | 10/1979 | Lewis | 264/171.16 |
| 4,227,041 | * | 10/1980 | Den et al. | 174/117 F |
| 4,312,554 | | 1/1982 | Wang | 339/74 R |
| 4,316,493 | | 2/1982 | Arena | 160/168 R |
| 4,404,424 | | 9/1983 | King et al. | 174/34 |
| 4,445,593 | | 5/1984 | Coleman et al. | 187/1 R |
| 4,461,923 | | 7/1984 | Bogese, II | 174/36 |
| 4,486,623 | | 12/1984 | Ploppa | 174/113 R |
| 4,516,922 | * | 5/1985 | Kanotz | 264/171.16 |
| 4,533,421 | * | 8/1985 | Pattridge | 264/171.16 |
| 4,568,507 | * | 2/1986 | Baxter | 264/171.16 |
| 4,579,410 | | 4/1986 | Soloman | 339/75 P |
| 4,586,770 | | 5/1986 | Poulin et al. | 339/74 R |
| 4,627,681 | | 12/1986 | Hong | 339/75 P |
| 4,654,476 | | 3/1987 | Barnicol-Ottler et al. | 174/116 |
| 4,677,256 | | 6/1987 | Bauer et al. | 174/116 |
| 4,680,423 | | 7/1987 | Bennett et al. | 174/36 |
| 4,734,544 | | 3/1988 | Lee | 174/117 F |
| 4,754,102 | | 6/1988 | Dzurak | 174/36 |
| 4,777,325 | | 10/1988 | Siwinski | 174/34 |
| 4,784,611 | | 11/1988 | Poulin | 439/346 |
| 4,820,187 | | 4/1989 | May | 439/389 |
| 4,867,697 | | 9/1989 | Borges | 439/265 |
| 4,909,749 | | 3/1990 | Long | 439/263 |
| 4,925,396 | | 5/1990 | Grover | 439/147 |
| 4,937,401 | | 6/1990 | Lee | 174/117 F |
| 4,945,189 | | 7/1990 | Palmer | 174/32 |
| 4,969,833 | | 11/1990 | Lindow et al. | 439/133 |
| 5,082,450 | | 1/1992 | Warren et al. | 439/102 |
| 5,129,836 | | 7/1992 | Ursich | 439/346 |
| 5,132,488 | * | 7/1992 | Tessier et al. | 174/34 |
| 5,281,162 | | 1/1994 | Ursich | 439/346 |
| 5,286,213 | | 2/1994 | Altergott et al. | 439/139 |
| 5,287,691 | | 2/1994 | Okamoto et al. | 57/236 |
| 5,336,103 | | 8/1994 | Herboldsheimer | 439/346 |
| 5,352,132 | | 10/1994 | O'Keefe et al. | 439/346 |
| 5,424,491 | | 6/1995 | Walling et al. | 174/113 R |
| 5,493,071 | | 2/1996 | Newmoyer | 174/113 R |
| 5,530,556 | | 6/1996 | Miura et al. | 358/300 |

* cited by examiner

PAIRED ELECTRICAL CABLE HAVING IMPROVED TRANSMISSION PROPERTIES AND METHOD FOR MAKING SAME

This is a divisional, of application Ser. No. 08/582,699, filed Jan. 4, 1996 now U.S. Pat. No. 5,767,441.

TECHNICAL FIELD

The present invention relates generally to paired electrical cables used for transmitting digital and analog data and voice information signals and is particularly directed to twisted cable pairs and a method for configuring each pair into an electrical cable so that at least one of the individually insulated wires is either equally or differentially pre-twisted before being paired with the other insulated wire. The resultant cable pairs and electrical cable possesses superior transmission properties, including minimal structural return loss, near-end crosstalk, and insertion loss when compared to conventional non-pre-twisted cable pairs and electrical cables made therefrom.

BACKGROUND OF THE INVENTION

As the use of computer and telecommunication networks and related electronic systems expands to meet the needs of the 21st century, it is imperative that the highest quality be achieved in the transmission of data and voice information signals over ever-increasing distances. The ability to transmit such information at the highest possible rate and with a minimum number of errors are two critically important features of any high quality analog or digital signal transmission system.

One method of transmitting these signals is by using an individually-twisted pair of electrical conductors such as insulated copper wires. These wires are typically coated with a plastic insulating material by an extrusion process. Although these conductors have been in use for quite some time, especially in the telephone industry, asymmetrical imperfections such as ovality of the surrounding insulating material, out-of-roundness or eccentricity of the wire cross-section, and lack of perfect centering of the wire within the insulation tend to limit their ability to transmit data without an insignificant amount of error.

These imperfections are essentially unavoidable during fabrication of the individual insulated wires due to a number of factors, including necessary clearances in the extrusion tools, tool wear, gravitational forces, unequal flow of the insulating compound around the wire during extrusion, and the dragging of hot insulation against water dams and surfaces in the insulation quenching trough. As the insulation cools around the conductive portion by passing through a quenching trough immediately after extrusion, the newly insulated wire then exit the water trough where it air drys and is taken up on reels. During this process, the insulated wires rotate first in one direction and then the other due to the action of the roller guides, sheaves and traverse mechanism. This causes the orientation of the imperfections heretofore described to rotate and oscillate as the wire is transported from pay-out to take-up reels in the fabrication process, so that the imperfections do not remain in a fixed plane.

Once insulated, a conventional method for pairing two insulated wires together is by twisting them together with a double twist pairing machine. During this process, the wires receive two "lay twists," or two complete rotations about a common axis, per revolution of the machine. In addition, each individual wire is twisted two turns about its own axis per revolution of the machine in the same direction as the pair lay twists, and this is commonly referred to as "back-twist." Thus, using conventional double twist pairing, back-twist is imparted to each wire at a rate of one twist per lay twist. Upon pairing, this combination of off-center conductors, out of roundness of insulation, etc., and back-twist generally creates periodic changes in the spacing between the conductors along the length of the twisted pair.

As a result of the aforementioned asymmetrical imperfections, rotations, and changes in the spacing between conductors, a variety of transmission problems can arise. These include signal reflections (i.e., structural return loss), distortion, and loss of power. Variations in the electrical impedance of the paired wires caused by the changes in the conductor spacing give rise to signal reflections. Due to their periodic nature, these reflected signals add in phase at a specific frequency rather than randomly, thereby causing excessive loss and distortion to the transmitted signal at this frequency. This typically causes increased distortion in the amplitude and phase of the transmitted signal, leading to a reduction in the signal-to-noise ratio. This degradation of the signal shortens the distance that a signal can be transmitted along the twisted pair without error and limits the maximum frequency that can be supported.

If the two insulated wires are paired together on a pairing machine that imparts no back-twist, the periodic spacing between conductors changes from minimum to maximum at a very rapid rate of one cycle per each turn of the pair. This short distance is usually only a small fraction of the wavelength of the highest frequency transmitted on the wire pairs, thus generally making the impedance variations transparent. As a result, the advancing signal travelling down the wire pair sees only the average impedance, which possesses minimal variability in comparison to the relatively high variability in impedance experienced with cable pairs that possess the normally imparted back-twist. However, single twist pairing machines which impart no back-twist are slower than conventional double twist machines. It is generally more difficult to control the wire tension in single twist pairing machines as well. These problems can raise production costs to unacceptably high levels.

After these wires have been twisted together into cable pairs, there are various methods in the art for arranging and configuring twisted wire cable pairs into a high performance data or voice transmission cable. Such cables typically contain several pairs of twisted conductors enclosed by a plastic jacket. The most popular method is to rotate several pairs together in a process known as cabling or stranding. Once this "core" has been formed, a plastic jacket is extruded over the formed core.

Another well-known method for fabricating such a cable is by a technique known as "full pressure" extrusion. In this method, a tapered tip is shaped to receive the coupled cable pairs in one end. As the cable pairs move through this tip, the tip constricts, forcing the cable pairs into individual channels that at the end of the tip are configured along with the die for the particular form the final cable will take. For instance, four cable pairs aligned side-by-side through an oval tip and associated die will form a flat cable, while four cable pairs arranged in a circular configuration through a circular tip and round die will form a round cable.

During the full pressure extrusion process, the tip is partially placed into a die so that a gap forms between the outer surface of the tip and the inner surface of the die. This gap narrows as the die and the tip taper to the desired final cable size and shape. As the cable pairs feed through the rear of the tip, heat softened cable jacketing compound feeds under pressure into the gap between the tip and die, extruding the material out of the exit at the tapered end of the die, which is known as the die face. In the full pressure extrusion process, the tip extends only partially into the die so that when the jacketing compound extrudes through the gap to meet the cable pairs, the heat softened jacketing compound forms not only the outside shape of the cable, but may encapsulate and isolate each of the individual pairs as well.

Another well-known method for forming high-quality cable is by "semi-tubed," "semi-sleeved," or "semi-pressure" extrusion. The difference between this method and the full pressure method is that, under the semi-pressure technique, the tip extends into the die towards the die exit. This has the effect of forcing most of the extruded jacketing compound to form more loosely around the cable core, keeping the majority of the compound around the perimeter of the cable that it forms. However, depending on tip and die settings, at times the compound will begin to settle into the intersities of the cabled core, resulting in undesired jacket compound fill.

In a jacketed cable, there exists a critical area around each of the individual cable pairs in which it is ideal to maintain well defined boundaries between materials of different dielectric constants. Since air is the ideal dielectric material, it is useful to maximize the amount of air space about the pair. This is typically achieved by controlling the jacket compound filling process to create as uniform an inner surface as possible. If this process is not controlled precisely enough to provide well defined boundaries between different dielectric materials, or if excessive pressure around the cable pair distorts the geometric lay-up (i.e., twisting pattern) of the pair, increased electrical alterations can result. Under the full and semi-pressure extrusion techniques, excessive jacket compound that forms around the individual cable pairs provide the cable with a high cross-sectional strength, but tends to distort the geometric lay-up of the pairs and to alter the air dielectric about them, resulting in unacceptable electrical alterations. Another disadvantage of excessive compound fill is that, since an outer jacket is formed around each of the cable pairs, stripping the jacket from the cable in the field requires each cable pair be individually stripped of jacketing compound. In modern day applications, when increased demands are being placed on data and voice transmission systems to deliver electrical signals at the highest possible rate and with a minimum number of errors, such limitations are a substantial roadblock to achieving these goals.

SUMMARY OF THE INVENTION

Accordingly, it is a primary object of the present invention to overcome the shortcomings and limitations of prior paired electrical wires and cabling techniques by providing a pre-twisted insulated cable pair having improved structural return loss characteristics at a variety of frequencies.

It is another object of the present invention to provide a pre-twisted cable pair having improved crosstalk response at a variety of frequencies.

It is still another object of the present invention to provide a pre-twisted cable pair having improved electrical properties that may be incorporated in a wide variety of cable pair types and configurations.

It is a further object of the present invention to provide a method of fabricating cables from pre-twisted cable pairs.

It is still a further object of the present invention to provide a method of fabricating cable from pre-twisted cable pairs in which the properly configured tip extends through the die such that the jacketing compound forms around the tip rather than directly around the cable pairs.

It is yet another object of the present invention to provide a method of fabricating cables from pre-twisted cable pairs in which the individual cable pairs are not encapsulated but still are separated by jacketing material created by controlled filling during the extrusion process to optimize the area about a pair comprising air space while still maintaining uniform spacing between pairs in order to provide optimum electrical and mechanical properties.

It is a yet further object of the present invention to provide a method of fabricating cables from pre-twisted cable pairs in which the two wires are differentially pre-twisted with respect to one another.

It is still another object of the present invention to provide a method of fabricating cables from pre-twisted cable pairs in which the two wires are twisted in opposite directions with respect to one another, or are paired in the opposite direction compared to their pre-twisted rotation Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, a pre-twisted cable pair is disclosed which possesses superior electrical properties, including lower structural return loss, improved near-end crosstalk response, and reduced insertion loss when compared to conventionally paired cables. In addition, an improved continuous-extrusion tubed jacketing process for fabricating electrical cables is disclosed. By controlling the jacketing compound fill between the individual cable pairs, this process creates uniform spacing between pairs while maximizing the air dielectric about the cable pairs, rendering an electrical cable having improved electrical and mechanical properties.

Before pairing, one or both of the insulated wires is pre-twisted about its own longitudinal axis such that the relative degree of pre-twist in the two wires is the same or different. When paired together by a conventional double-twist pairing machine, the wires maintain this pre-twist ratio as they are paired and additionally twisted about a common axis. As the individual wires rotate about their own axis and revolve about a common axis during pairing, the angular position (i.e., a particular position with respect to the center of the wire) of any given point on the surface of each wire changes, in which the word "point" refers to a cross-sectional representation of a line of contact between the surfaces of the two wires along the length of the pair of wires.

In order to achieve the optimum electrical performance, the conductor-to-conductor spacing must be constant and non-changing throughout the cable's length. This could be achieved by perfectly centering the conductor in the insulation surrounding it, which is virtually impossible due to inherent limitations using conventional manufacturing techniques. The other solution would be to insulate the conductors of a pair simultaneously adjoining or bonding both wires of the pair together at or near the extrusion head. Since the off-centering of conductors occurs largely due to tip and die positioning, this process locks the insulated conductors together prior to the off-centered insulated conductors being able to rotate, therefore creating very uniform conductor-to-conductor spacing throughout the length of cable. This solution, however, leads to increased termination time in the field due to the need to separate the bonded insulated conductors.

Since most twisted pair cables are limited in terms of the maximum frequency they can support due to the distances required and the associated signal loss over these distances, by identifying the maximum frequency to be supported, optimum electrical characteristics can be achieved up to this frequency by cycling the maximum-mininum conductor-to-conductor spacing within a very short distance, e.g., less than approximately ⅛ wavelength of the highest frequency signal to be supported.

With the pre-twisted wire pair, the relative angular positions of each wire do not remain constant as they rotate about their own axis at different rates. Thus, the line of contact between the surfaces of each wire is constantly changing its angular position so that no point on the surface of one wire stays in contact with any other point on the surface of the other wire through any given twist length. This construction has the effect of cycling the variations in spacing between centers of the conductors caused by ovality of the surrounding insulating material, out-of-roundness or eccentricity of the wire cross-section, and lack of perfect centering of wire within the insulation at a very high rate per unit length of the pre-twisted cable pair. The result is a cable pair having a significant reduction in impedance fluctuation and significantly improved transmission properties up to a signal frequency having approximately a ⅛ wavelength equal to or greater than the distance within which these variations are repeated.

The pre-twisted cable pair may then be assembled with any number of other such cable pairs to form a cable by a continuous-extrusion tubed jacketing process. During this process, a tapered, threaded tip is inserted so as to be either flush or near-flush with a matching tapered die of greater inner dimensions. The gap created by this diameter differential creates an extrusion path through which jacketing compound flows. A number of pre-twisted cable pairs are fed through the receiving end of the tip while heated jacketing compound is simultaneously and continuously fed through the extrusion path between the tip and die outer surfaces. As the pre-twisted cable pairs move to the tapered end of the tip, they are guided into individual channels for final alignment. Finally, the extruding heated jacketing compound meets and encloses the pre-twisted cable pairs beyond the die exit. As the newly-jacketed cable pairs exit the die, they pass through a quenching trough which solidifies the jacketing compound to form a cable whose cross-sectional structure consists of internal ridges that do not extend entirely across the inner width of the cable jacket, yet which define individual channels for each of the pre-twisted cable pairs. Superior electrical properties of the resultant cable are achieved because the unique tip/die configuration yields a well-defined inner jacket surface and prevents the ridges from bonding to one another, thereby allowing an optimal "air dielectric" about each pair to be maintained, along with uniform pair-to-pair separation in an easily removed jacket.

A variety of pre-twisting combinations may be realized by the present invention. For instance, only one wire may be pre-twisted uniformly or pre-twisted with random amounts while the other is not pre-twisted at all, both may be pre-twisted uniformly or pre-twisted with random amounts, one may be uniformly pre-twisted while the other is pre-twisted with random amounts, or one may be uniformly pre-twisted along a different twist length than the other uniformly pre-twisted wire providing the cycling of conductor-to-conductor spacing to be less than ⅛ wavelength of the highest signal frequency to be carried by the pair. In addition, the cable pair may be surrounded by an outer jacket of electrically insulating material, or by an outer electrostatic shield of electrically conducting material. The cable may consist of anywhere from a minimum of one to a large number of cable pairs, all of which may be configured in a flat or round overall cable design. The pairs may also be assembled in unidirectional, oscillating, or helical paths in which the cabled pairs first rotate clockwise, and then rotate counterclockwise along the axis of the cable in a given mechanical oscillation cycle.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Hereinafter, the terms "twist length" or "lay length" are used in the conventional sense as referring to the distance in which each of two paired wires makes one complete 360 degree revolution about a common axis. Likewise, the term "twist frequency" is hereinafter used to define the number of twists per a specified length of wire pair. In this sense, a paired wire set with a four inch twist length has a twist frequency of three twists per foot.

Figure 1A:
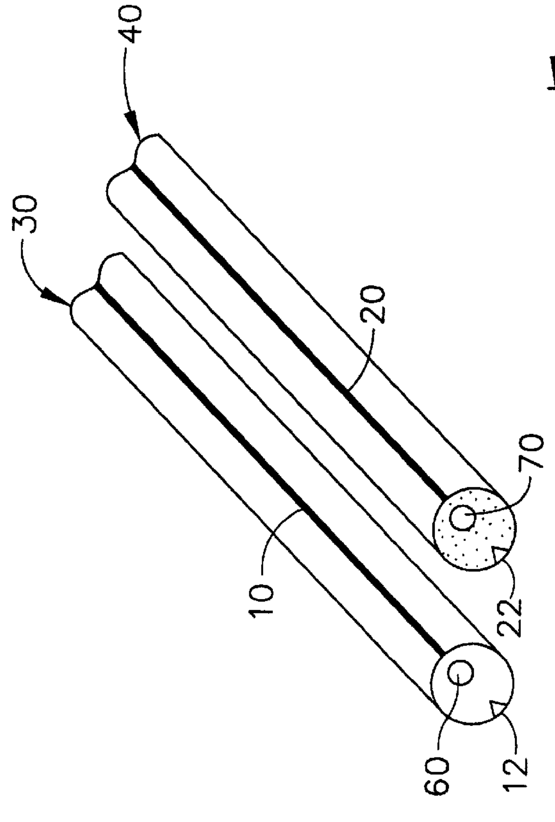
FIG. 1A (PRIOR ART)
FIGS. 1A and 1B are perspective views of two prior art non-pre-twisted insulated wires before and after pairing by conventional pairing machines which impart back-twist into each wire.
Figure 1B:
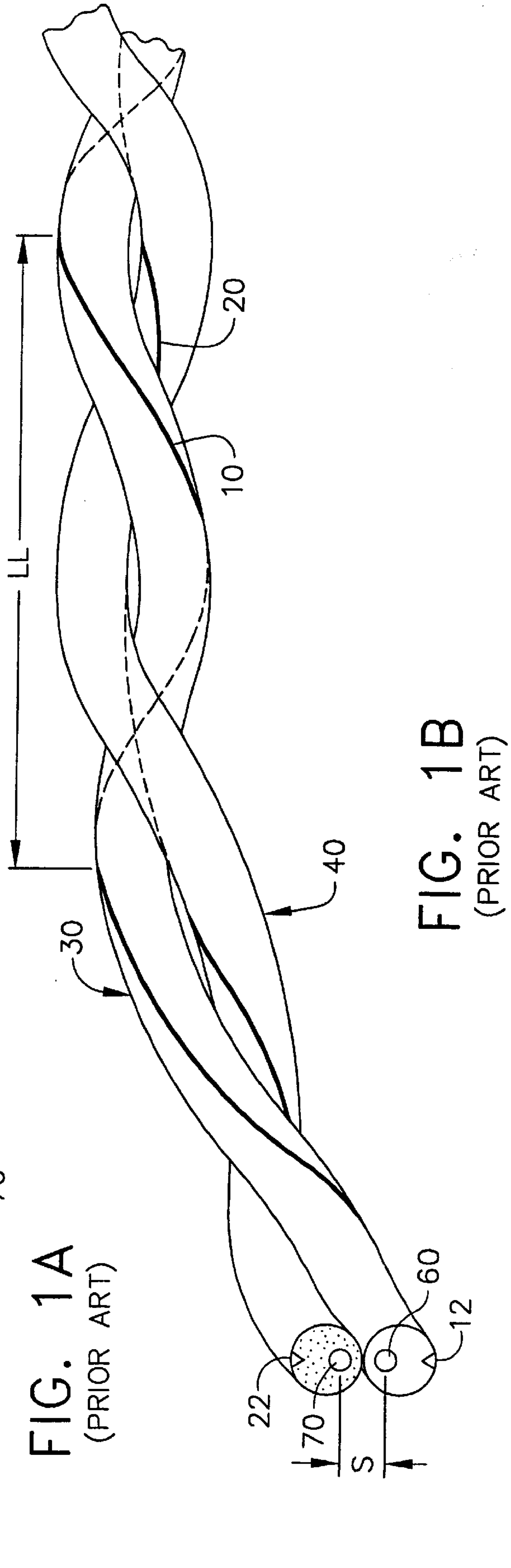
FIG. 1B (PRIOR ART)

Referring now to the drawings, FIGS. 1A and 1B depict a conventional set of non-pre-twisted insulated wires before and after pairing via the conventional techniques. In FIG. 1A, the longitudinal stripes 10 and 20, depicted on the surface of the insulation surrounding each insulated conductor of wires 30 and 40, are placed in the figures for purposes of illustration only so that a wire's individual rotation about its longitudinal axis may be more easily depicted. Because these wires are not pre-twisted, the longitudinal stripes on each wire in FIG. 1A remain in approximately the same angular orientation (i.e., in a straight line at one particular angular position with respect to the center of the wire) for a considerable distance (greater than ⅛ wavelength of the highest frequency to be supported).

As shown in FIG. 1B, during pairing by conventional pairing machines which impart back-twist, the wires are typically "lay twisted" by a 360 degree revolution about a common axis along a predetermined length known as the twist length or the lay length (and depicted by the dimension "LL"), forming a "cable pair." Thus, the illustrative example of FIG. 1B depicts a single-lay twist section of a cable pair, a ¾ inch twist length and a corresponding twist frequency of 16 twists per foot.

Figure 1C:
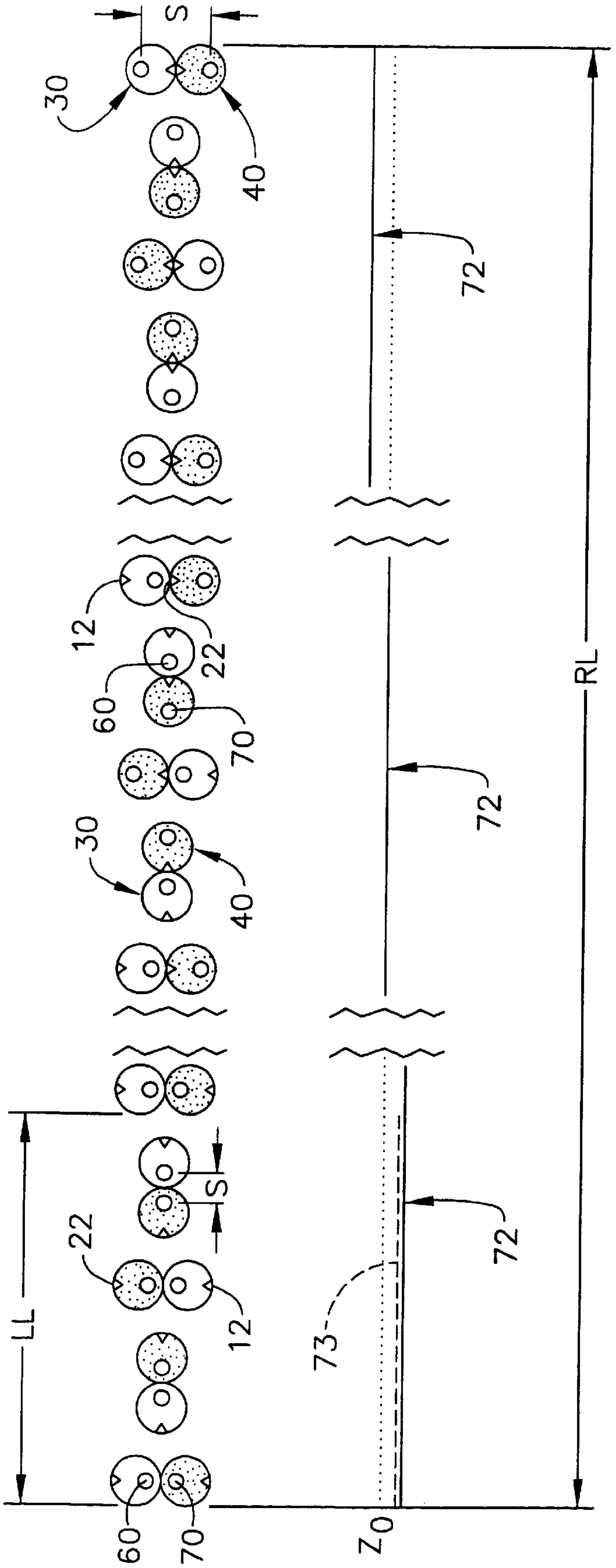
FIG. 1C (PRIOR ART)
FIG. 1C includes cross-sectional views at various distances along the length of one individually-twisted cable pair made by a conventional pairing machine known in the prior art that imparts back-twist, featuring the relative orientations of each individual wire and spacing between the two conductors during the lay twist sequence and the attendant back-twist imparted, and the electrical impedance resulting from the varying conductor-to-conductor spacing.

The curvature of stripes 10 and 20 in FIG. 1B indicate that as a result of the double twist pairing process, each of the wires 30 and 40 has also rotated 360 degrees about its own respective longitudinal axis over the ¾ inch twist length such that one "back-twist" is imparted into each wire for each lay twist of the cable pair. The practical effect of this back-twist is twofold, and is shown in FIG. 1C, which are cross-sectional views of two wires 30 and 40 shown in quarter twist length increments as they rotate about a common axis as well as their individual axis as indicated by the arrows. The first effect of the back-twist phenomenon is that the relative orientation between any two points, such as lines 10 and 20 in FIG. 1B, or points 12 and 22 on FIG. 1C, remains generally constant throughout the entire twist length.

The second and more important result is that the distance "S" between the centers of the conductors 60 and 70 of wires 30 and 40 of FIG. 1C, in any given cross section, hereinafter referred to as "conductor-to-conductor spacing," remains generally constant over a given twist length as well. Because input impedance is proportional to conductor-to-conductor spacing, this relatively constant conductor-to-conductor spacing renders a relatively slow-changing impedance profile segment 73 over one period of twist, (i.e., one twist length or lay length, as shown by dimension LL) as shown in FIG. 1C as a portion of the cable's continuous impedance profile designated by the index numeral 72 which extends along a "rotation" length (i.e., dimension "RL") of FIG. 1C.

Over longer distances (typically between 1.5 and 30 feet for a rotation length RL), however, the twist length and the consistency of wire rotation will slowly vary, causing any given point of contact and the conductor-to-conductor spacing between the two wires to slowly vary as well. Thus, the impedance measured over any given twist length may be higher or lower than that measured over a twist length in a different location. This is shown by impedance profile 72 of FIG. 1C, where the continuous impedance profile $Z_0$ (which is the basis for calculating the average, or characteristic impedance) is curve 72 mapped as a function of paired cable length at a frequency of 100 MHz, for which the quarter-wavelength is approximately 18 inches (since the velocity of propagation is about 60% for these twisted pairs).

Figure 1D:
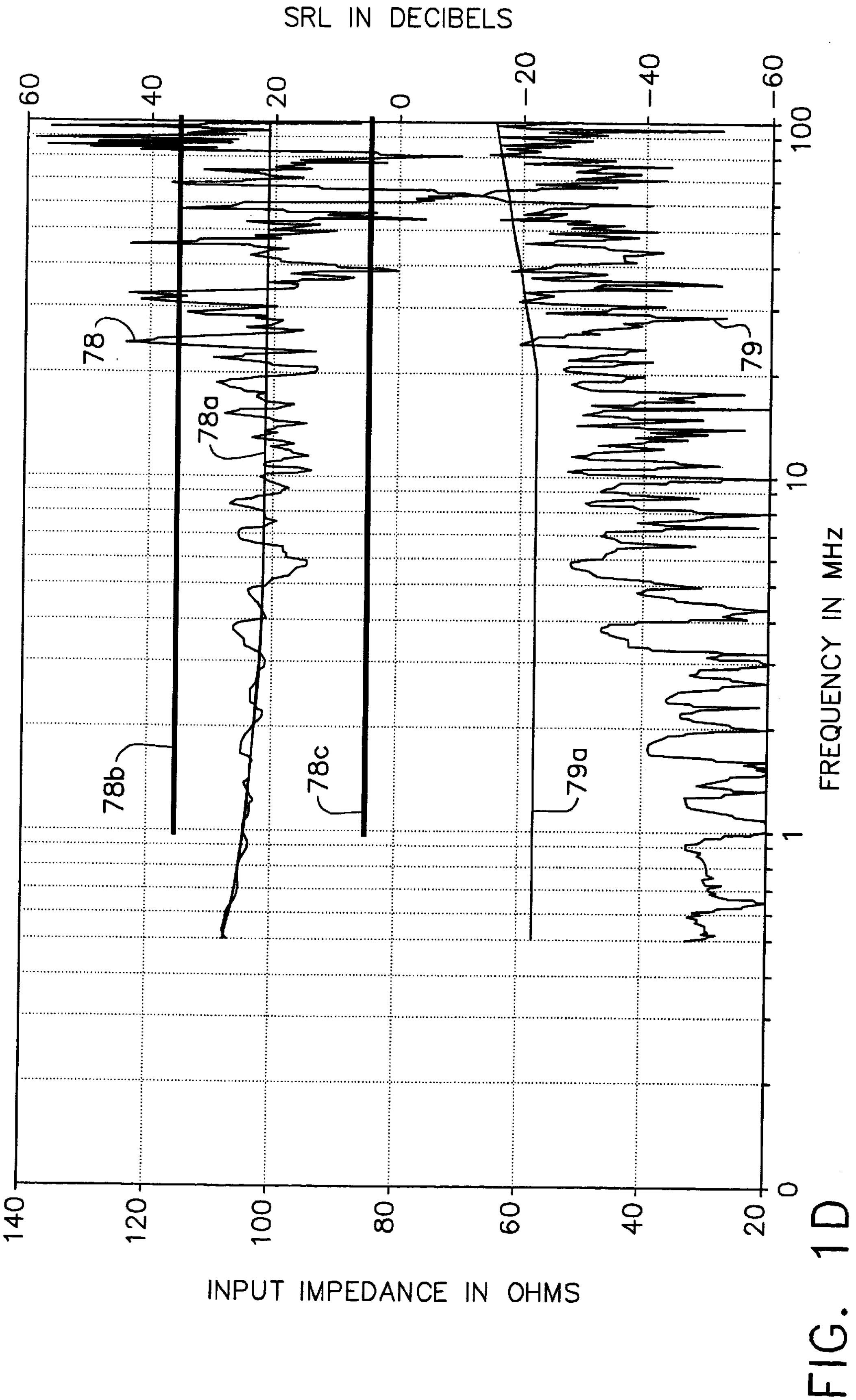
FIG. 1D (PRIOR ART)
FIG. 1D is a graph illustrating representative curves of input impedance and structural return loss for the cable pair depicted in FIG. 1C.

With cabled pairs made by the double-twist technique, a target input impedance of 100Ω can typically fluctuate by ±30Ω (see curve 78 on FIG. 1D, which depicts the measured input impedance of this cable pair) given a significant length of cable 328 feet (100 m) in which multiple reflections occur and add in phase, as shown in FIG. 1D. However, this fluctuation in input impedance is very gradual when experienced over any given two-inch twist length as seen by the curve segment 73. This slow variation is exacerbated if either wire has poor centering, ovality, or is out of round. Thus, even though the impedance profile 72 is relatively constant as measured over one twist length, its average magnitude tends to increase or decrease over longer distances as the effects of the aforementioned imperfections and variations are experienced as indicated by different curve segments 72 and 73. This increased fluctuation in impedance over longer distances results in excessive structural return losses (SRL) in electronic signals having frequencies in the transmitted band shown up to 100 MHz (e.g., see curve 79 on FIG. 1D). Note that the curve 78*a* on FIG. 1D represents the characteristic impedance of this cable pair as determined by the industry standard curve-fitting method.

The lines 78*b* and 78*c* on FIG. 1D represent the limits of impedance for a "category 5" cable and, as is easily discerned in FIG. 1D, the impedance (i.e., curve 78) of the prior art cable constructed as per FIGS. 1A, 1B, and 1C does not stay within the desired range at signal frequencies between 50 MHz and 100 MHz. The curve 79*a* on FIG. 1D represents the "category 5" SRL limit, which is exceeded in places at signal frequencies between 50 MHz and 100 MHz by the prior art cable constructed as per FIGS. 1A, 1B, and 1C.

Figure 2A:
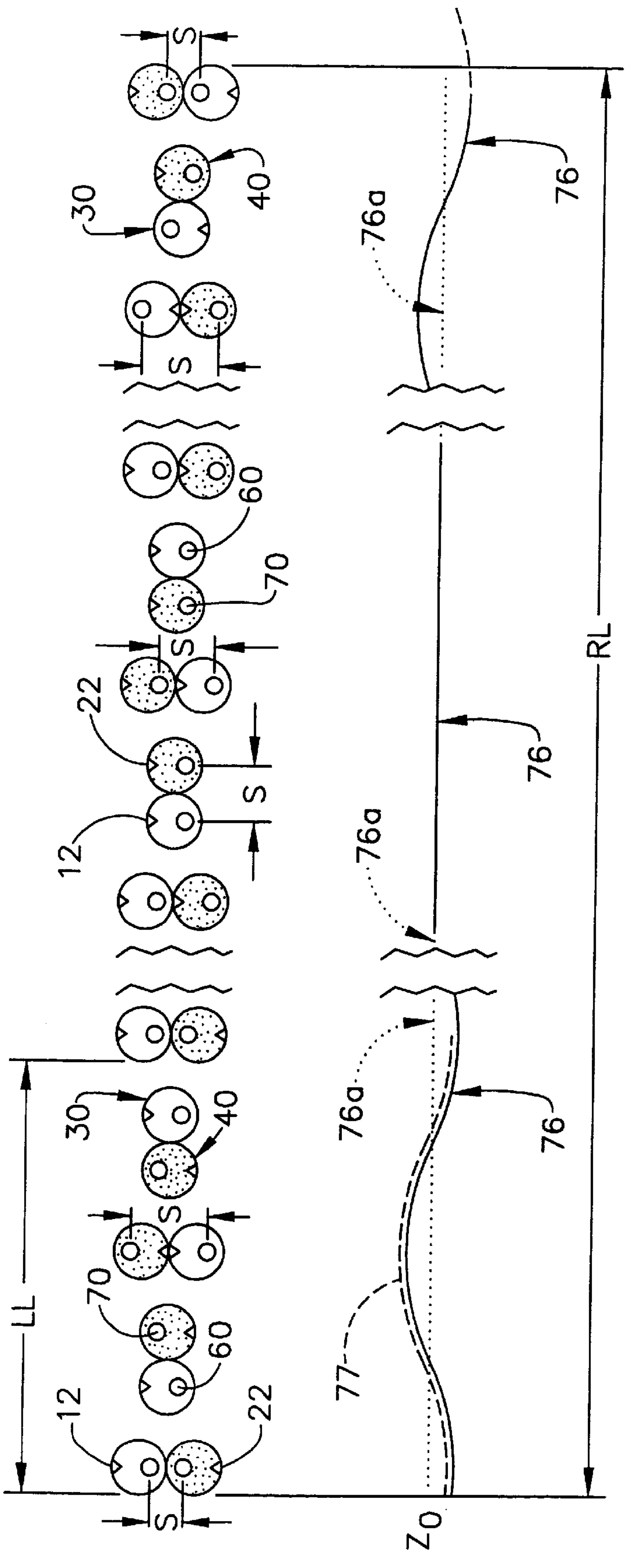
FIG. 2A includes cross-sectional views at various distances along the length of one individually-twisted cable pair made by a pairing machine which imparts no back-twist, featuring the relative orientations of each individual wire and the spacing between the two conductors during the lay twist sequence, and the electrical impedance resulting from the more rapidly varying conductor-to-conductor spacing.

On the other hand, in pairing machines which impart no back-twist, as depicted by the cross-sectional pairing sequence of FIG. 2A, wires 30 and 40 move around the common center axis with no back-twist such that any given point on the surface of either wire's insulated coating (such as points 12 or 22), contacts its opposite wire's corresponding point only once within one twist length (which, for example, could be ¾ inches as illustrated by the dimension LL in FIG. 2A). Thus, imperfections in wire centering, ovality and wire roundness (which cause variations in conductor-to-conductor spacing) cycle completely within an electrically very short distance of one twist length LL, which, for example, could be as short as ¾ inches. The attendant variations in impedance (which is related to the conductor-to-conductor spacing, dimension "S") also completely cycle within one twist length LL, but are discernable only at much higher frequencies where ¾" becomes greater than ⅛ wavelength and approaches ½ wavelength. Therefore, this impedance variation is not "seen" by signal frequencies up to 100 MHz in this example. These variations in impedance are shown, for example, in the impedance profile segment 77 of FIG. 2A of the cable's continuous impedance profile 4 designated by the index numeral 76 along a wire rotation length RL of typically 1½ feet to 30 feet, and the corresponding plot of input impedance as a function of paired cable length in FIG. 2B over several twist lengths. In FIG. 2A, signal frequencies up to about 100–200 MHz see the average input impedance as depicted by the curve 76*a* (and not the rapid cycling of curve 76).

Figure 2B:
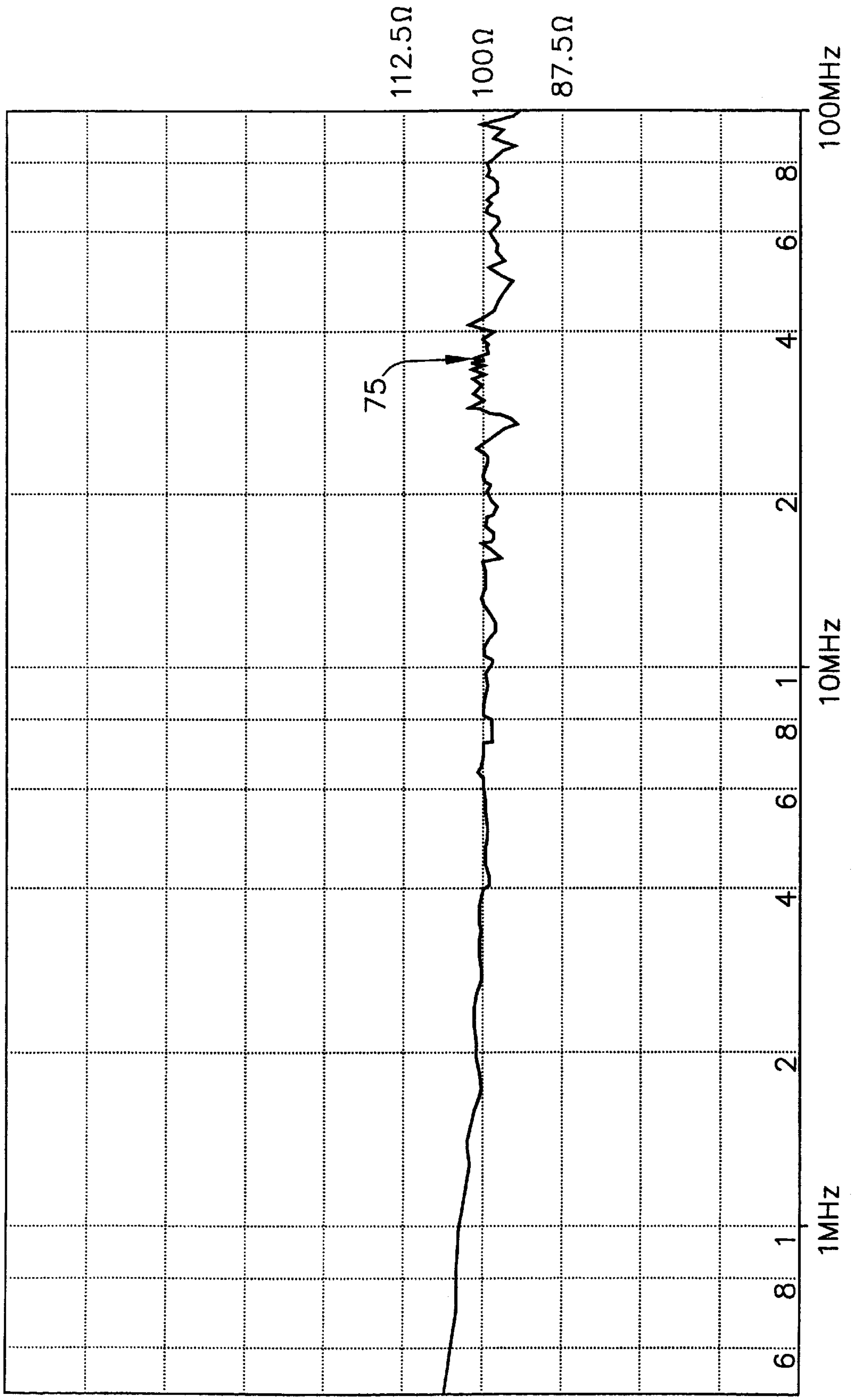
FIG. 2B is a graph illustrating a representative curve of input impedance for the cable pair depicted in FIG. 2A.

Such relatively rapid cycling of the impedance results in a reduced fluctuation in input impedance over the frequencies for which such cable pairs are typically used in commonly-installed long cable runs. FIG. 2B shows a target input impedance of 100Ω over a 100 MHz range that fluctuates by less than ±12Ω (see curve 75 on FIG. 2B) with cables paired by machines that impart no back-twist. This fluctuation is easily within the "category 5" limits of impedance and represents a sizable improvement over the ±15Ω "category 5" specification. Due to this improved impedance response, structural return loss below 100 MHz is accordingly low. Any noticeable impedance variation and structural return loss degradation is pushed to well above 100 MHz signal frequency in this example. The conductor center rotation as viewed at different cross-sections over a relatively long length (dimension RL) is due to twisting introduced into the wire during the insulation process and subsequent handling. Since this twisting occurs over long distances, it is undetectable when examining a relatively short ¾ inch lay length LL.

The inherent technical advantages of single twist pairing with no back-twist makes it a very attractive technique; however, the aforementioned engineering difficulties and high costs associated with implementing the single twist method have hindered its widespread use on a production basis. To overcome this problem, one embodiment of the present invention emulates some of the beneficial characteristics derived from the no-back-twist action of the single twist technique, while also using conventional double twist machines to create the pairs by pre-twisting the individual wires before pairing, thereby obtaining the benefits of improved transmission at minimum cost.

Figure 3B:
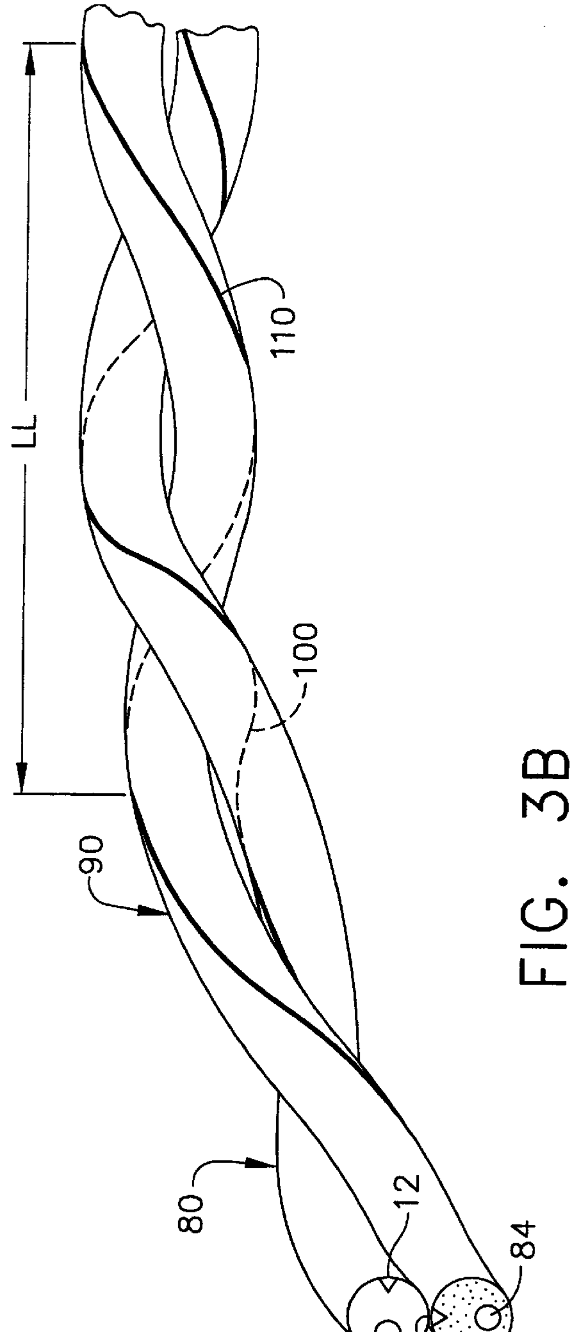
FIGS. 3A and 3B are perspective views of one pre-twisted insulated wire and one non-pre-twisted insulated wire combining to form a cable pair according to the principles of the present invention, before and after pairing by the typical double-twist technique.
Figure 3A:
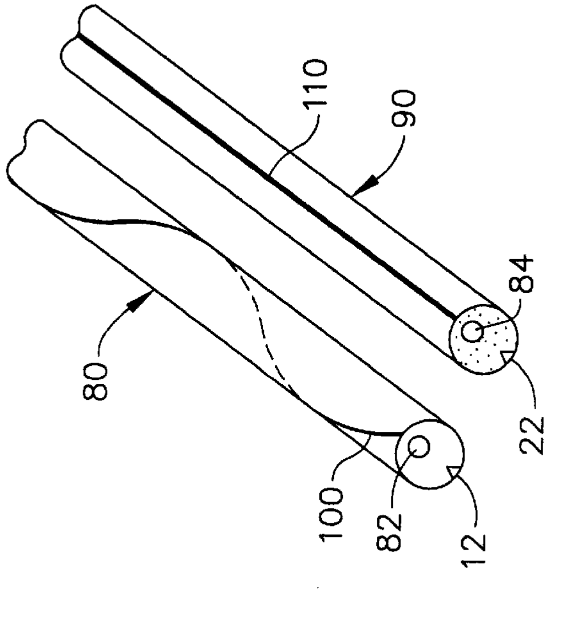

In a preferred embodiment depicted in FIGS. 3A and 3B, a first wire 80 is pre-twisted before being paired with another wire 90 in a conventional double twist machine. In the example of FIG. 3A, a "spiraled" stripe 100 on the insulated surface of wire 80 indicates a pre-twist of one complete 360 degree revolution about its longitudinal axis. Note that the second insulated wire 90 has no pre-twist imparted before pairing, as indicated by its straight "longitudinal stripe" 110. It will be understood that both the insulative coating and the center conductive portion 82 are twisted to create wire 80.

Pairing by the conventional double twist method accomplishes the result shown in FIG. 3B, in which an individually twisted pair, designated by the index numeral 120, is created from wires 80 and 90 which are lay twisted about a common axis by one complete 360 degree revolution over, for example, a ¾ inch twist length (i.e., dimension LL). As shown by stripes 100 and 110, the double twist pairing technique imparts one back-twist to each of insulated wires 80 and 90 over the ¾ inch twist length, so that insulated wire 90 has one back-twist while insulated wire 80, which already contains one pre-twist, contains a total of two twists in this example.

This unique pre-twisting technique in one configuration can render a differential twist, in which there is a ratio other than 1:1 between the twists of wires 80 and 90. This differential twist has the effect of ensuring that the conductor-to-conductor spacing of wires 80 and 90 varies one cycle over a short distance of less than ⅛ wavelength of the highest signal frequency to be transmitted, which minimizes the detrimental effects of off-centering and insulation ovality, thereby yielding minimal reflections and losses of the transmitted signal. It has also been demonstrated that the low impedance fluctuation of less than ±15Ω, as depicted in FIG. 2B, is achievable in the pre-twisted cable of the present invention, even when assembled on a double twist machine, resulting in an impedance curve 88 and SRL curve 89 depicted in FIG. 3C when using the same eccentric insulated conductors which failed SRL limits when paired without pre-twist.

Figure 3C:
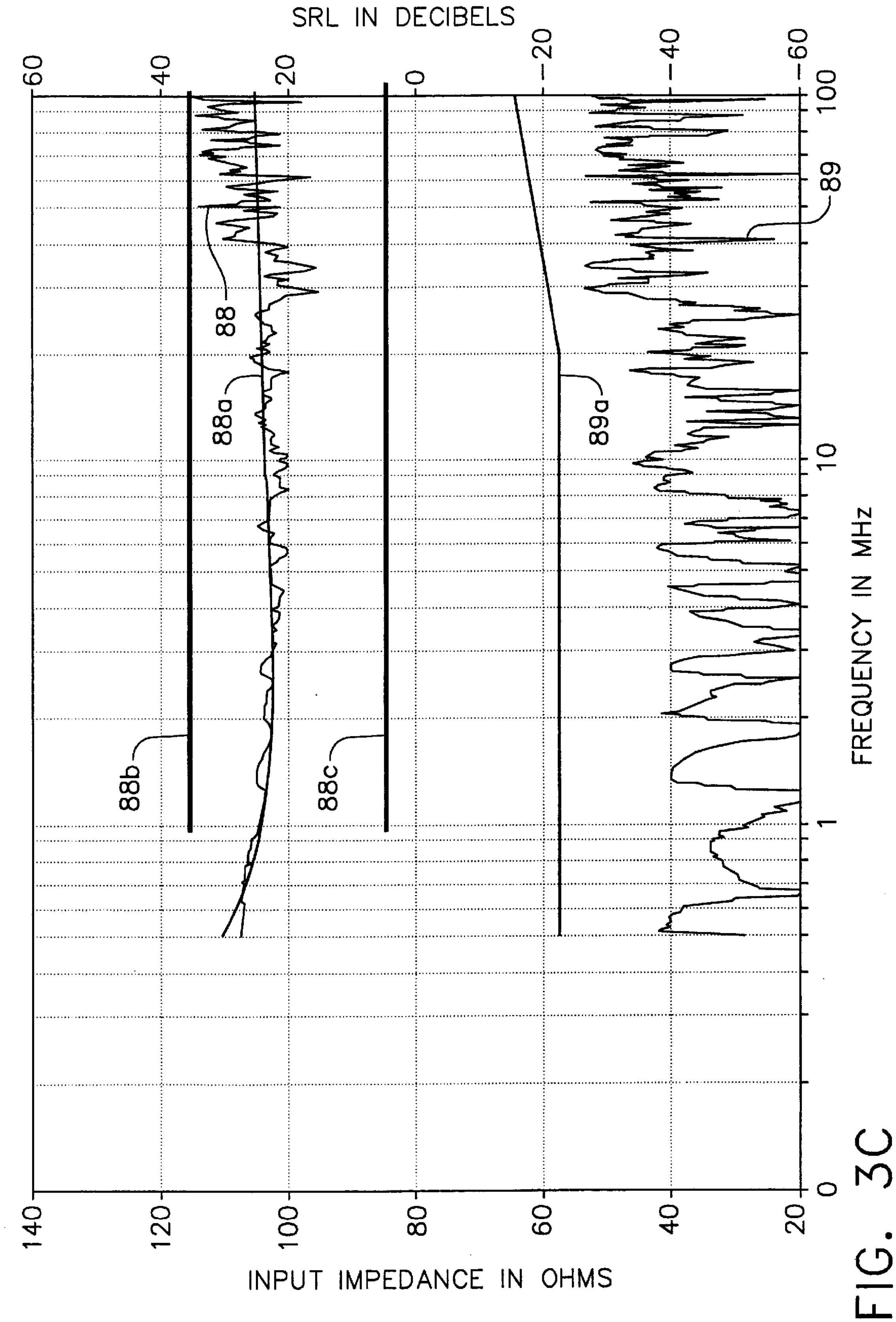
FIG. 3C is a graph illustrating representative curves of input impedance and structural return loss for the cable pair depicted in FIG. 3D.

The lines 88*b* and 8& on FIG. 3C represent the limits of impedance for a "category 5" cable, and the impedance (i.e., curve 88) of the cable constructed as per FIGS. 3A and 3B remains within the desired range at signal frequencies up to 100 MHz. The curve 89*a* on FIG. 3C represents the "category 5" SRL limit, and this cable construction provides an acceptable SRL parameter at signal frequencies up to 100 MHz.

It will be understood that the concept of imparting a pre-twist to one or both wires is a key aspect of this configuration of the present invention, and imparting differential twists to the wires is an additional aspect of the present invention. A wide variety of pre-twisting combinations are encompassed by the principles of the present invention. An economical pairing combination has been demonstrated in which some degree of pre-twist is imparted in only one wire 80 while no pre-twist is imparted in the other wire 90, which is a version of differential pre-twisting.

Some of the variations on the pre-twisted cable pair structure include a configuration where the amount of pre-twisting in any single wire may be constant or random throughout its length, or the rotation of pre-twist in the individual wires may be in the same direction with respect to each other, the same direction with respect to the rotation of twist of the resultant cable pair, or in opposite directions with respect to each other or with respect to the rotation of twist of the resultant cable pair. Both wires may be paired such that the combined twist length in each wire is uniform or random. It will be understood that, where a wire is pre-twisted, the conductive center of that wire is twisted along with its insulative coatings.

Although the economical solution may be to pre-twist only one conductor, additional electrical benefits may be achieved by pre-twisting both insulated conductors in the same direction and amount, or with the same lay length.

Figure 3D:
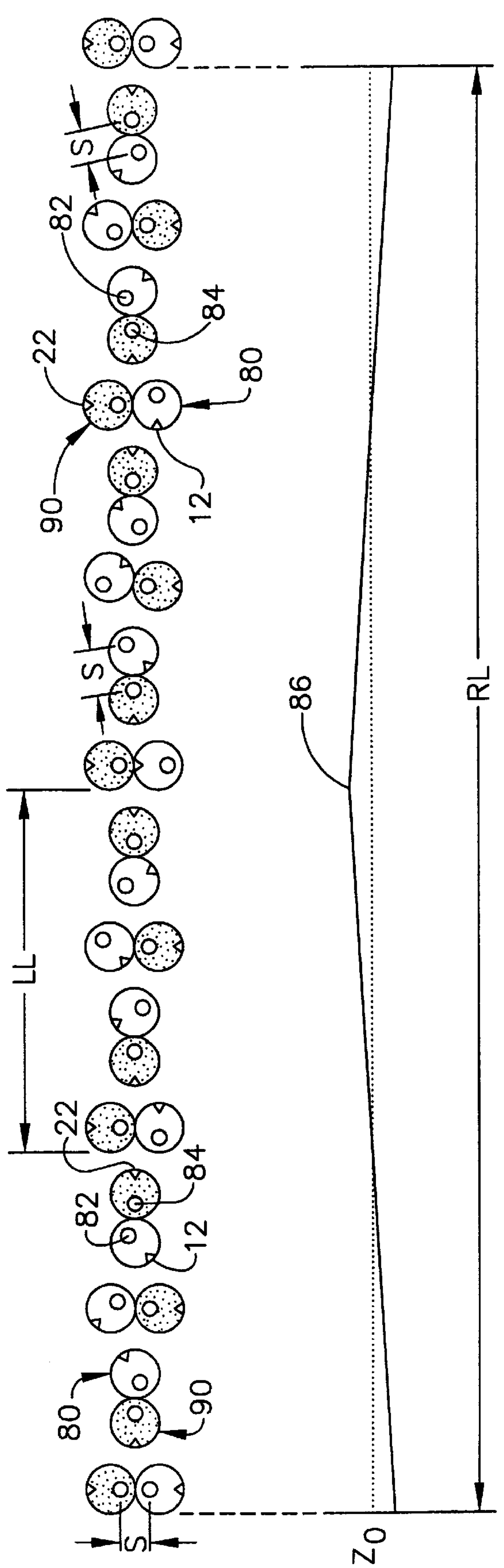
FIG. 3D includes cross-sectional views at various distances along the length of one individually-twisted cable pair made by a pairing machine that imparts back-twist featuring the relative orientations of each individual wire and the spacing between the two conductors during the lay twist sequence and the attendant back-twist imparted, in which one wire is pre-twisted and the other wire is not. Also shown is the impedance resulting from this controlled spacing of the conductors.

When the pre-twist is placed into both insulated conductors in the same direction as the pairing lay, the conductor-to-conductor spacing "S" (as detailed in FIG. 3D) might be varied a greater degree or cycled more frequency within each pre-twist length LL. This increased cycling throughout such a short distance may prove beneficial in further cancelling of signal reflection by accounting for a wider range of impedance fluctuation within a short distance in order to cover the slight increases in S that will occur due to the twist imparted in the insulated conductors during the insulation process. It will be understood that pre-twisting at very short twist lengths in the same direction as pairing can cause too much total twist to be imparted, thus causing mechanical failures (and should be avoided). As can be seen in FIG. 3D, the rotation length (dimension RL) is quite short (only a few lay lengths, LL) as compared to the rotation length of other example cable constructions described hereinabove.

As one example, if wire 80 is pre-twisted at a uniform length of 4 inches, assuming the relative position of its conductor 82 remains constant in a three-inch length of wire, and given the "slow" rate of rotation introduced during the insulation process, the conductor-to-conductor spacing "S" varies in a relatively short distance (e.g., 3 inches).

Figure 2C:
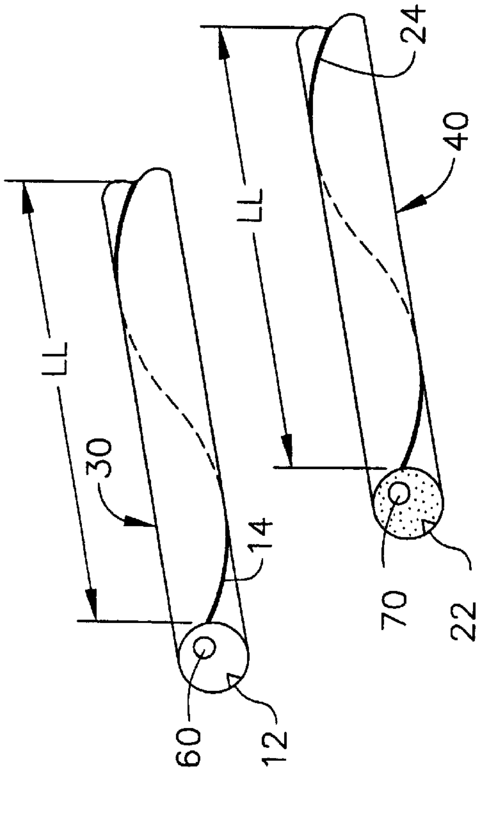
FIGS. 2C and 2D are perspective views of two pre-twisted insulated wires combining to form a cable pair according to the principles of the present invention, before and after pairing by a double-twist technique in which the direction of pairing is opposite that of the pre-twist, and the lay lengths of the pre-twist and the pairing are the same.
Figure 2D:
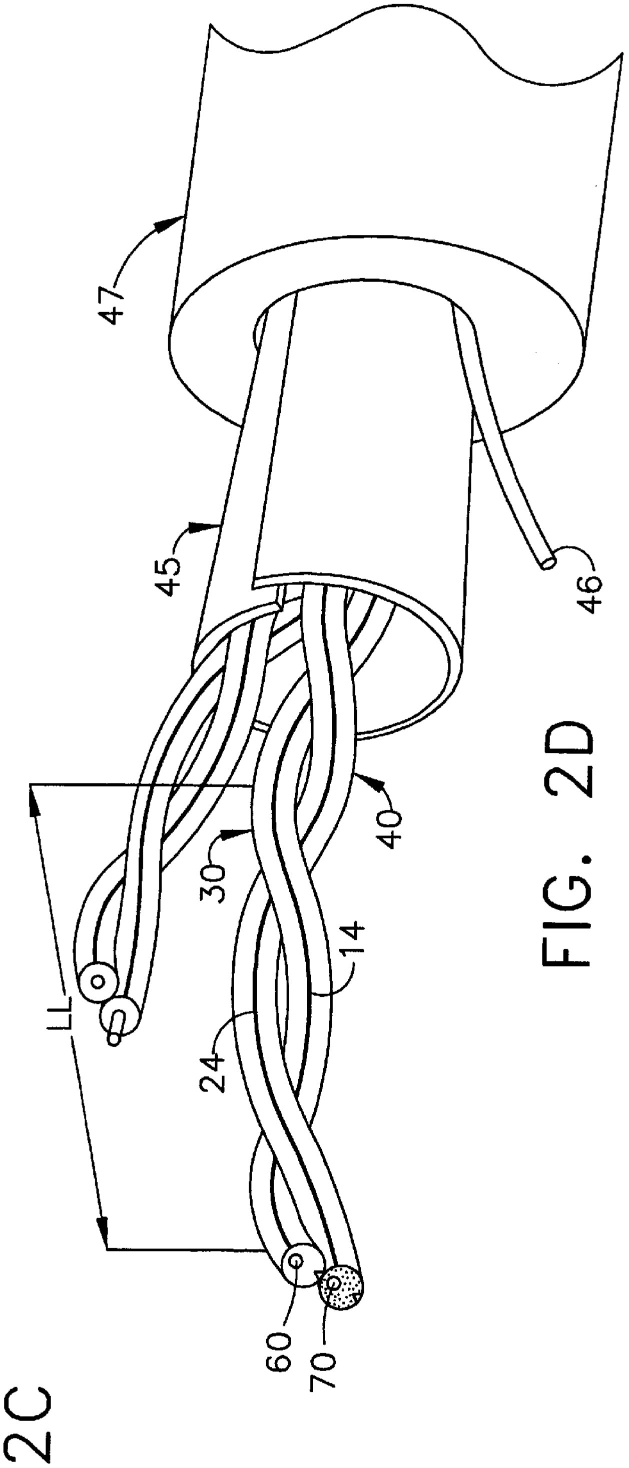

A high degree of electrical benefit may be achieved by pre-twisting both insulated conductors the same lay length, but in the opposite lay direction as the pairing lay (see FIGS. 2C and 2D). This method of implementation has the affect of cancelling the effects of the imparted back-twist to yield a product with the characteristics depicted in FIGS. 2A and 2B. This is achieved by pre-twisting both wires at the same lay length (dimension LL), for example, a ¾" Right-Hand pre-twist (as indicated by the spiraled stripes 14 and 24 on FIG. 2C), in the opposite direction as the "pairlay" (i.e., pre-twist Right-Hand, pair left-Hand), which completely negates the affects from a machine that imparts a ¾" Left-Hand back-twist (which is equal to lay length LL) when set up to pair two wires with a ¾" left-Hand lay (see FIG. 2D, in which the "spiraled" stripes 14 and 24 have become longitudinal (i.e., non-twisted) with respect to each respective individual wire 30 and 40). With the pre-twist cancelling the back-twist, the only conductor rotation remaining is that which was introduced during the insulating process and subsequent wire handling. This has the same effect as using a single twist pairing machine which imparts no back-twist.

Figure 3E:
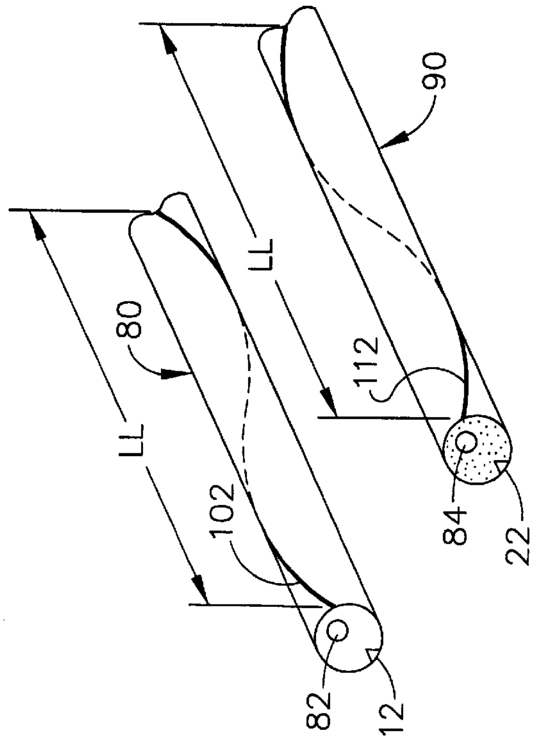
FIGS. 3E and 3F are perspective views of two pre-twisted insulated wires combining to form a cable pair according to the principles of the present invention, before and after pairing by a double-twist technique, in which the directions of the individual pre-twists are opposite one another, and the lay lengths of the pre-twist and the pairing are the same.
Figure 3F:
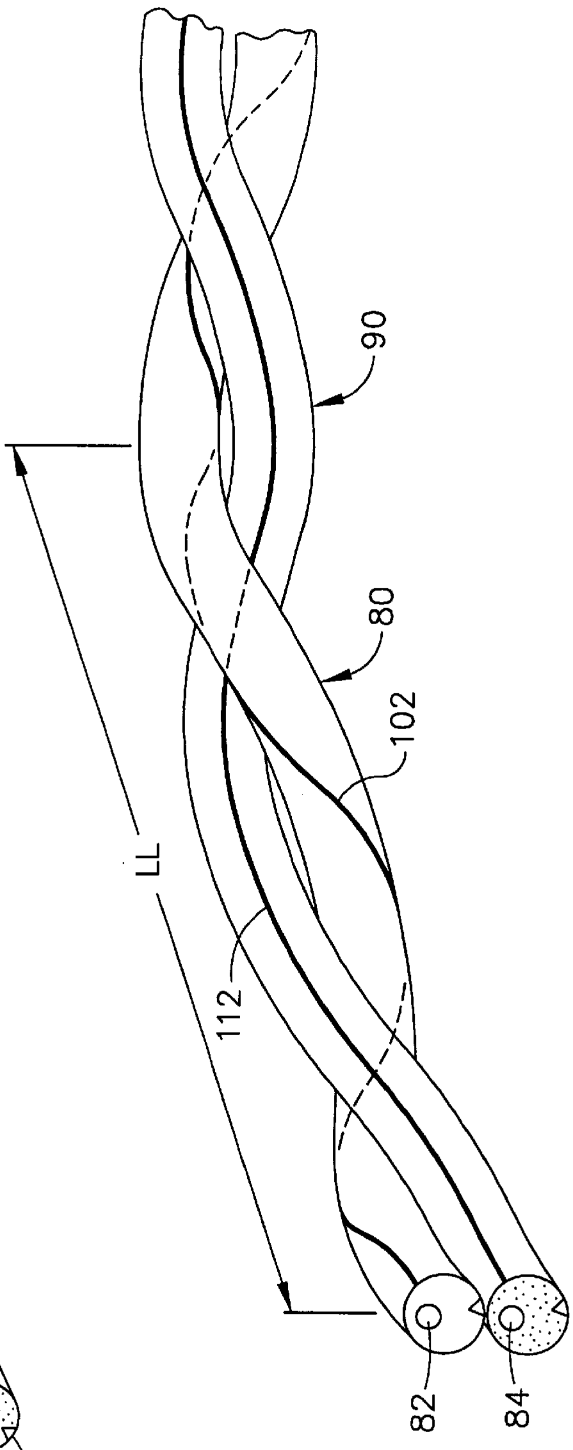

As an alternative, each of the individual wires could be pre-twisted in opposite directions from one another (see FIG. 3E), so that, after being paired on a pairing machine that imparts back-twist, the end result is a cable pair (see FIG. 3F) having characteristics similar to the embodiment illustrated in FIGS. 3B–3D. The exact twisting would not be the same as in FIG. 3B, however, the impedance and relative cross-sections would be similar to FIGS. 3C and 3D, where dimension RL would span a different number of lay lengths LL. In FIG. 3E, wire 80 has a Left-Hand pre-twist and wire 90 has a Right-Hand pre-twist, both of the same lay length (dimension LL). After pairing, the pre-twist effect has been essentially removed from wire 90 (and "spiraled" stripe 112 has become longitudinal on FIG. 3E) due to the Right-Hand pairing lay at the same lay length LL. Of course, wire 80 becomes twisted at a higher twist frequency (as indicated by spiraled stripe 102 on FIG. 3F), now essentially having two twists per lay length LL.

It will be understood that, although it is not currently viewed as a preferred method of implementation, the pre-twist length of the wires may be random as well as uniform. If random pre-twisting is to be used in a paired cable, it is preferred that the cycling rate of conductor-to-conductor spacing be controlled to the extent that the distance it extends does not exceed about 1/8 wavelength of the maximum signal frequency.

The cable pairs may be used alone or in combination with other cable pairs that may or may not have been paired in the same manner. The cable pairs may also be used in a variety of configurations, including, but not limited to, jacketed and unjacketed, shielded and unshielded. In addition, cable pairs configured in parallel or in a circular arrangement, including oscillated as well as unidirectional modes, can be employed as required by their application. Oscillated constructions consist of cable pairs which sequentially rotate one direction, and then rotate in the other direction, over one oscillation period. Unidirectional and oscillated constructions are preferred for round cables, while paralleled pairs are desired for flat cables. In all multiple-pair cables or where single pairs are placed side by side, it is desirable to stagger the length of the pair lays to minimize crosstalk couplings. The final twist length for the pairs in the cable must be carefully selected and controlled, as well as the amount of pre-twist of each conductor.

In experiments performed using pre-twisted cables having both equally and differentially pre-twisted conductors, a significant reduction in impedance fluctuation was achieved. Using conventional pairing techniques, a target input characteristic impedance of 100Ω in a cable pair without a pre-twist can typically fluctuate by ±30Ω. In experiments performed on cable pairs with pre-twist of the present invention, the target input characteristic impedance varied by only ±12Ω, as shown by the curve on FIG. 2B, which is well within the Proposed European Specification ISO/IEC DIS 11801 tolerance of ±15Ω.

An unexpected improvement in near-end crosstalk performance has also been achieved during experiments with the pre-twisted cable pairs as well. Crosstalk response was suppressed by a measured quantity at 100 MHz of 46 dB on a pre-twisted cable pair, which is 14 dB better than the 32 dB industry standard. In addition, experiments performed using both flat and round cables fabricated from pre-twisted cable pairs have resulted in a 5% to 10% reduction in insertion loss at frequencies up to and above 100 MHz compared to the conventionally-paired insulated wires.

Figure 4:
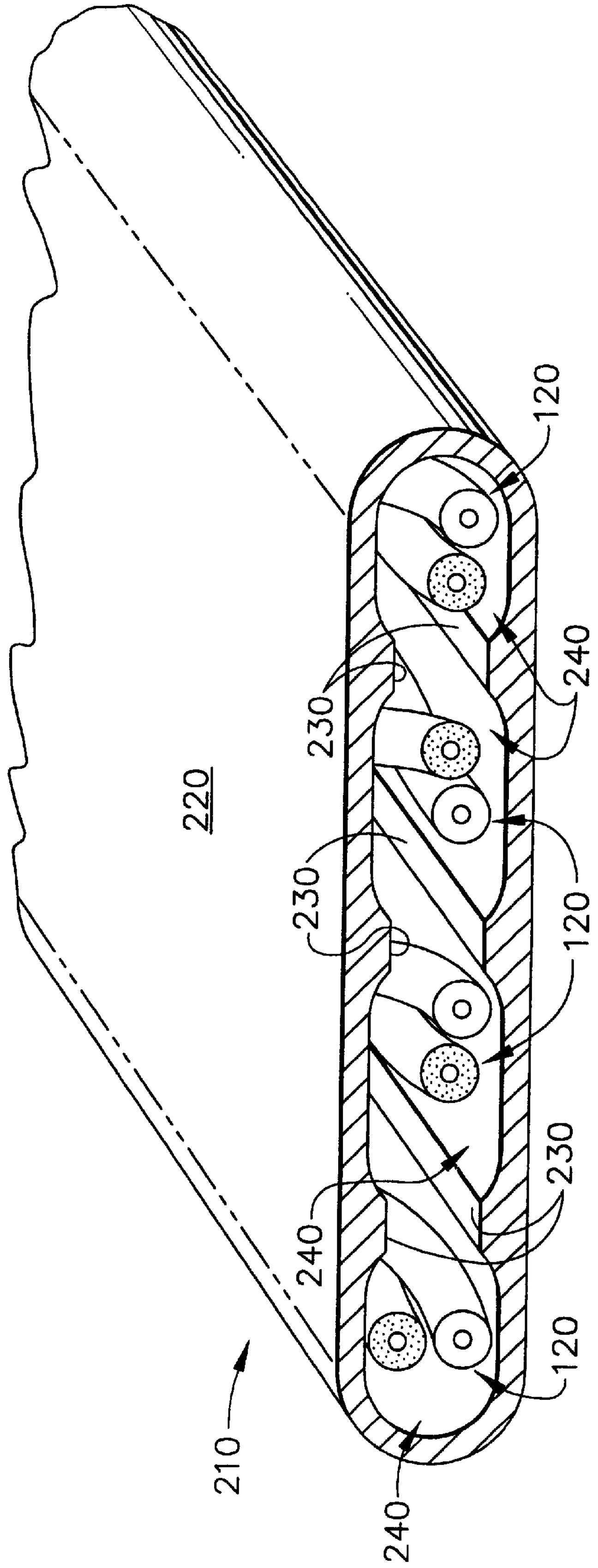
FIG. 4 is a perspective view of a preferred embodiment of four pre-twisted cable pairs as seen in FIG. 3B incorporated in a flat cable manufactured according to the principles of the present invention.
Figure 5A:
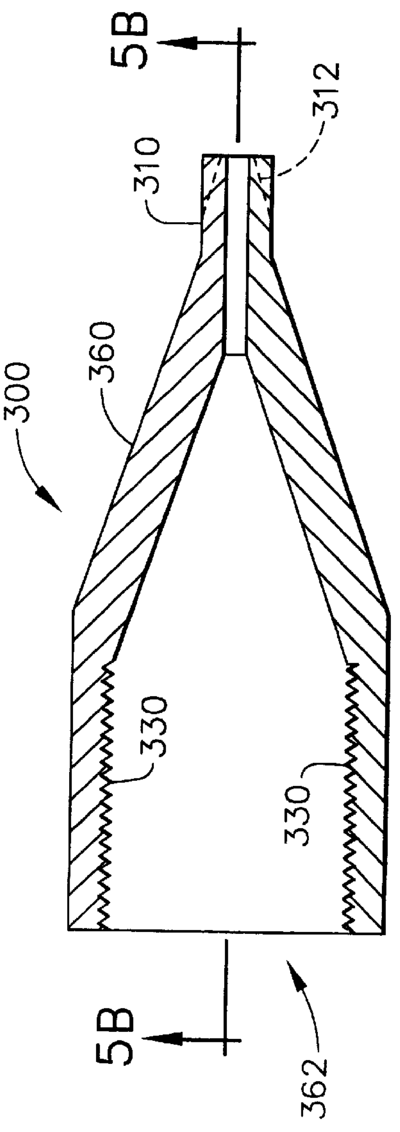
FIG. 5A is a cross-sectional view of a tip used in the manufacturing process to create the oval flat cable of FIG. 4.
Figure 5B:
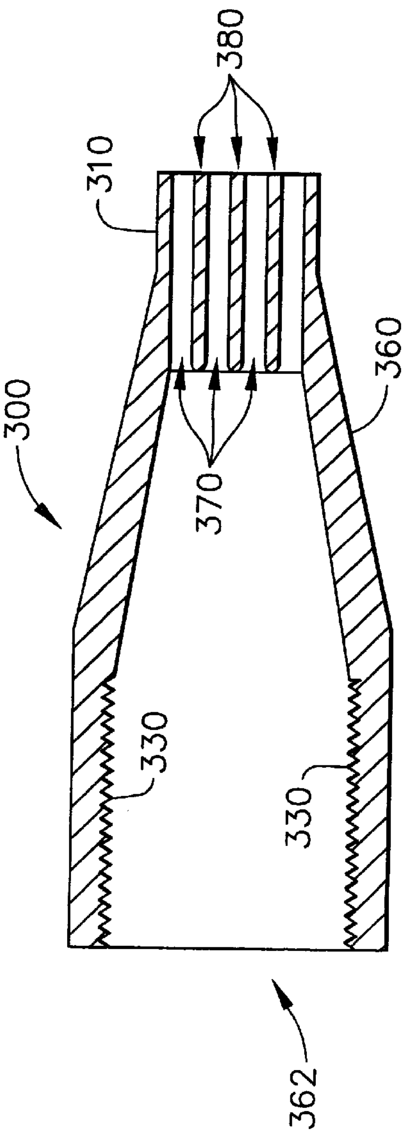
FIG. 5B is a cross-sectional view of the tip of FIG. 5A, taken along the line 5B—5B.
Figure 5C:
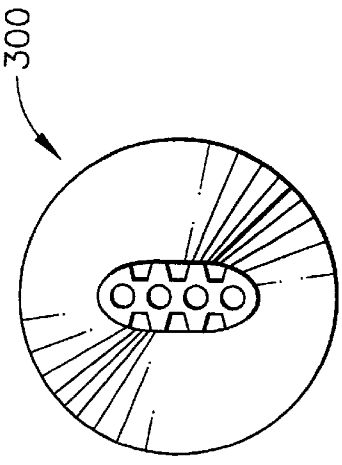
FIG. 5C is a front view of the tip of FIG. 5A.
Figure 6A:
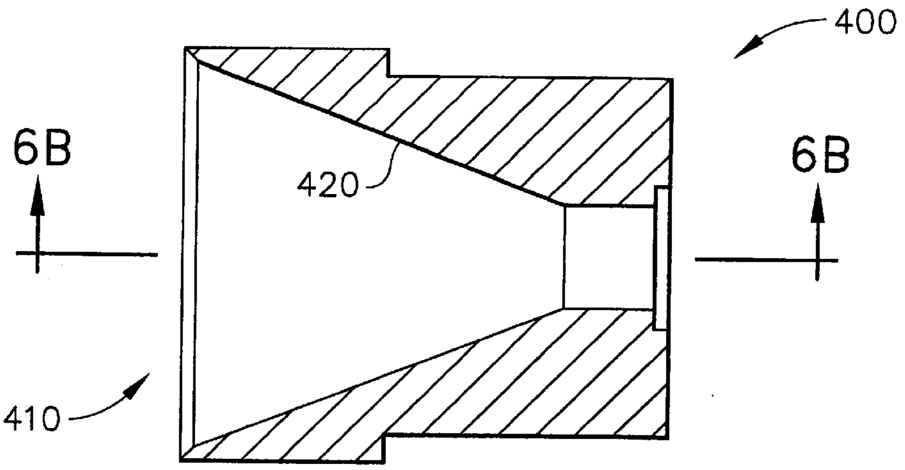
FIG. 6A is a cross-sectional view of the die used in the manufacturing process to create the flat cable of FIG. 4.
Figure 6B:
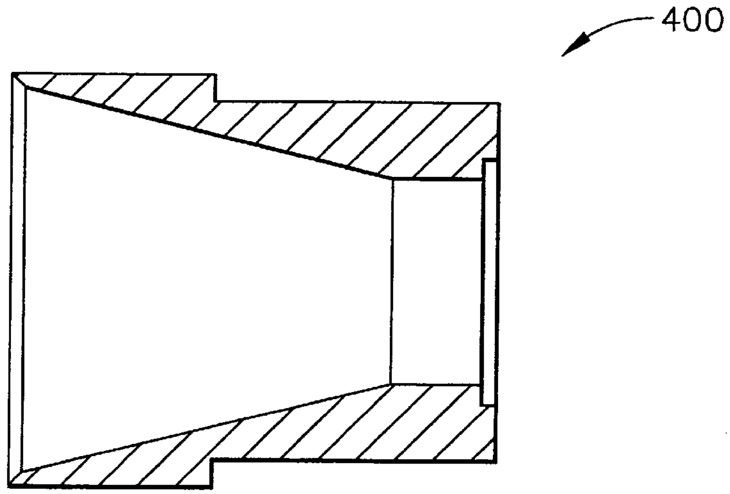
FIG. 6B is a cross-sectional view of the die of FIG. 6A taken along the line 6B—6B.
Figure 6C:
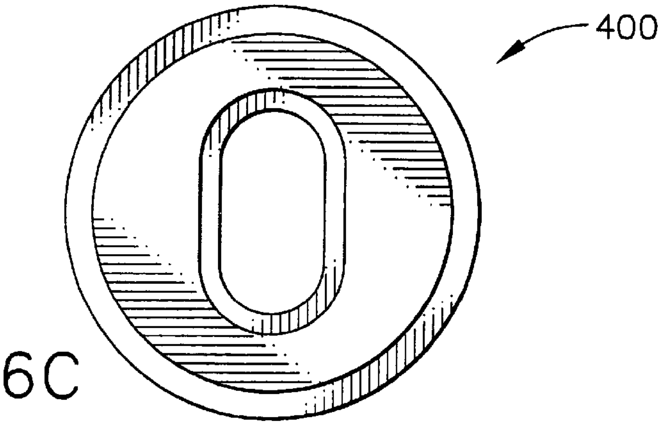
FIG. 6C is a front view of the die of FIG. 6A.

Attention will now be turned to a preferred method for assembling/jacketing high quality electrical cable using pre-twisted cable pairs in an extrusion process. FIG. 4 is a cross-sectional perspective view of a flat cable 210 containing four pre-twisted cable pairs 120 constructed according to the principles of the present invention used for the transmission of electrical signals. In order to maintain the electrical performance benefits derived from these cable pairs 120, it is important to maintain a certain separation or critical area about each of the cable pairs 120, which defines an "air dielectric." The outer jacket 220 is formed to create ridges 230 on the inside diameter of outer jacket 220. These ridges 230 define individual channels 240 for each of the cable pairs 120. Because the ridges 230 from the top and bottom of the outer jacket 220 do not actually join one another, the air dielectric is more readily maintained, resulting in improved electrical performance.

Figure 7:
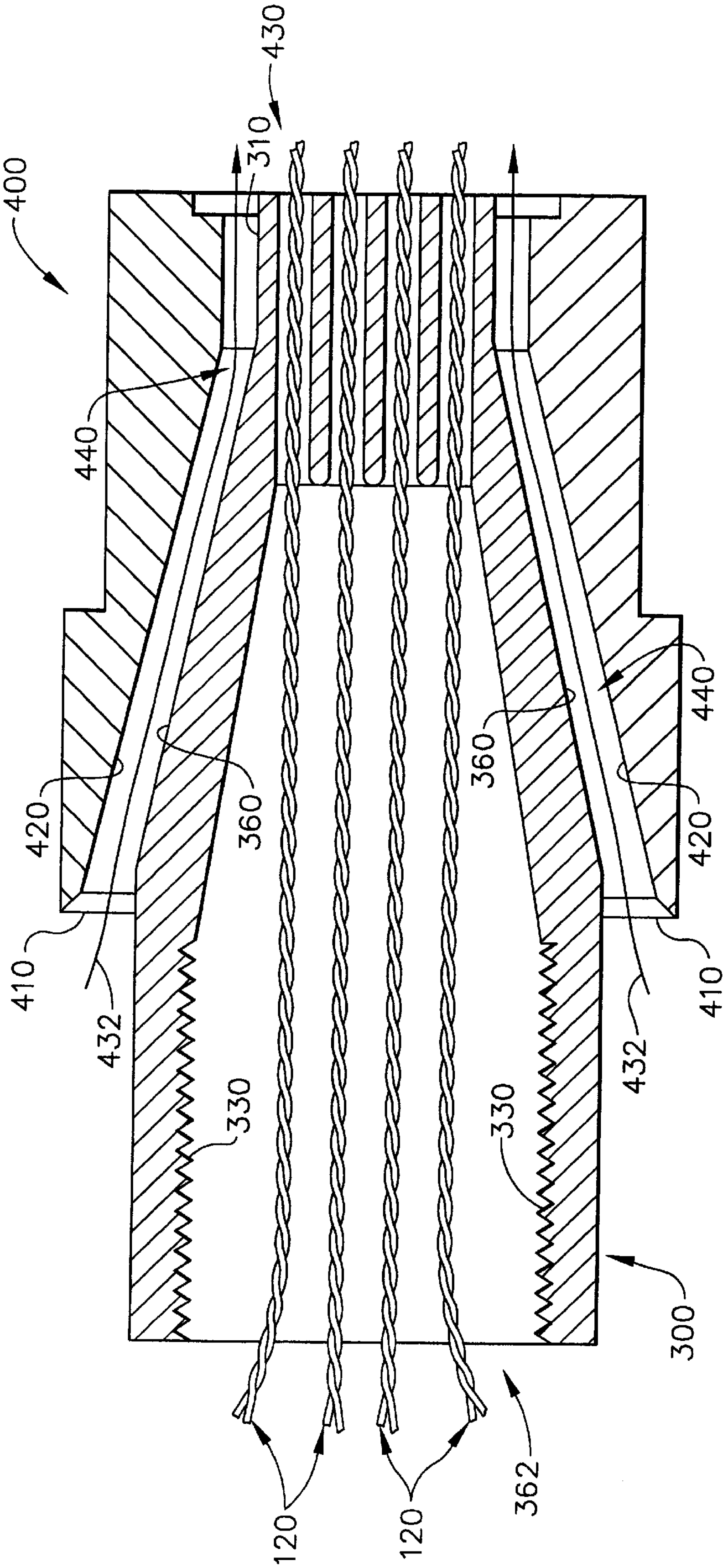
FIG. 7 is a cross-sectional view of the assembled die and tip used in the continuous-extrusion tubed jacketing process of the present invention.

To prevent the jacketing compound from intruding into the critical areas about the cable pairs 120, flat cable 210 is constructed using a continuous-extrusion tubed jacketing process. FIGS. 5A–5C and 6A–6C show various views of a tip 300 and a die 400 which are used in the tubed jacketing process of the present invention. FIG. 7 is a cross-sectional view of the continuous-extrusion tubed jacketing process for a preferred flat cable with four cable pairs. In this process, the tapered end 310 of tip 300 extends all the way through the die 400, forming a face 430 such that the jacketing compound forms around the tip 300 rather than directly around the cable pairs 120. The outer jacketing compound "sets" or solidifies before the ridges 230 have a chance to come in contact with each other from opposite sides of the outer jacket 220.

In a preferred method of fabricating an oval flat cable 210 of the present invention illustrated in FIG. 7, tip 300 is threaded and held in position by a threaded tube (not illustrated for the sake of clarity) by way of threads 330 which are disposed on the inner diameter of tip 300 and outer diameter of the threaded tube. Positioning of the tip with standard round tips is generally not a critical issue, so tip 300 is merely threaded so that it snugly abuts the shoulder of the threaded tube. However, when an oval tip is used, such as tip 300, alignment between the tip 300 and the die 400 is more important, so appropriately selected washers or spacers (not shown) preferably are placed between the shoulder of the threaded tube and tip 300. Keys or pins may be used to hold tip 300 and die 400 in any desired orientation. For many jacketing materials, it is preferred that tip 300 and die 400 are oriented flush to one another at face 430, as viewed in FIG. 7. For other materials, it may be desirable for tip 300 to be positioned near-flush to the opening in die 400 at the face 430.

Tip 300 is inserted into die 400 at its tip receiving end 410. When the tip is in place, sufficient clearance is maintained between the outer surface 360 of tip 300 and the inner surface 420 of die 400 to provide an extrusion path 440 through which jacketing compound 432 may flow. The notches 312, depicted near the tapered end 310 of tip 300 on FIG. 5A, allow jacketing compound to flow to form the ridges 230 (as seen in FIG. 4).

The continuous-extrusion tubed jacketing process begins when a number of pre-twisted cable pairs 120 are fed through the cable pair receiving end 362 of tip 300. In a preferred embodiment, #24 AWG wire is used for each wire of the cable pairs; however, a variety of different sizes of wire can be utilized depending on the desired final product. Heat softened cable jacketing compound 432 is simultaneously fed through the extrusion path 440. As the cable pairs 120 feed through the interior of tip 300 and approach the tapered end 310, they are directed into individual channels 370 for final alignment before joining the extruding cable jacketing compound to form the flat cable 210. Channels 370 are formed by barriers 380 present in the tapered end 310 of tip 300. Once extruded from the face 430, the newly-jacketed cable is directed into a quenching trough (not shown) for quenching, which "sets" or solidifies the jacketing compound.

The illustrated embodiment of this process is for forming a substantially oval-shaped flat cable, as determined by the shape and configuration of tip 300 and die 400. The cable jacketing compound can be any material suitable for forming cable jackets, such as polyethylene or polyvinyl chloride. Since the preferred process is based on continuous extrusion, the typical head pressure usually does not exceed 2,000 psi. The preferred temperature of the jacketing compound at the face 430 is 350° F. (177° C.), and depending on the jacketing compound used, the optimum temperature of the quenching water can be room temperature (70° F. to 80° F.—21° C. to 27° C.), or even hot (120° F. to 130° F.–49° C. to 54° C.). The preferred cable feed rate is 500 feet per minute. The distance between the face 430 and quenching trough should be enough to hold the cable jacket shape, and good results have been achieved with a distance of three (3) inches. It will be understood that the preferred values of the aforementioned parameters are interdependent, and will change with different jacketing compounds, tooling materials and dimensions, wire diameters, feed rates, final cable shape, and orientation of the cable pairs.

The above process results in a twisted-pair cable which is substantially improved over conventional twisted-pair cables. The unique cable cross-sectional structure provides improved electrical properties, and gives adequate cross-sectional strength to the cable, thereby minimizing the risk of buckling, which can cause pair-to-pair distortion during installation. In addition, since the cable jacket does not encapsulate each individual cable pair, stripping the jacket to expose the cable pairs is a one-step process, saving both time and energy for ease of installation and maintenance.

The above process also minimizes handling of the individual cable pairs such that they are not physically brought together until the jacketing operation, where they are then fed directly into their individual channels. This feature allows the cable pairs to maintain virtually the same electrical performance and physical characteristics they exhibited after pairing.

It is preferred that this continuous jacketing process be used with non-jacketed pairs of wires, but the present invention is not limited to this type of cable only. Individually jacketed or individually shielded pairs of wires can also be assembled using this technique, as can both shielded or non-shielded flat cable jackets.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of jacketing a plurality of electrical wires arrayed generally side-by-side in a row to thereby form a substantially flat cable, said method comprising the steps of:

(a) providing a die having an inner surface, a first end with a first opening for receiving jacketing compound and a plurality of wires, and a second end with a second opening for exiting an electrical cable jacket;

(b) providing a tip having an outer surface, a plurality of notches in the outer surface, a first end with a first opening for receiving said plurality of electrical wires, and a second end with a second opening for guiding the individual said electrical wires and for exiting said electrical wires;

(c) positioning said tip within said die such that an extrusion path is created between the outer surface of said tip and the inner surface of said die and forming an exit at a junction of said second end of said die and said second end of said tip;

(d) supplying a plurality of electrical wires through said first end of said die and said first end of said tip;

(e) supplying jacketing compound through said extrusion path so that said jacketing compound forms a jacket with an inner wall around said electrical wires at said exit, said jacket comprising a plurality of internal ridges that are formed by said plurality of notches and that extend partially from the inner wall of said jacket to form channels, such that air gaps are left between pairs of the ridges on opposite sides of the inner wall of the jacket, whereby air is between adjacent wires; and (f) passing said cable through a quenching medium sufficient to form said cable.

2. The method as recited in claim 1, wherein said electrical wires each comprise a pre-twisted pair of wires.

3. The method as recited in claim 1, wherein said electrical wires each comprise a differentially-twisted pair of wires.

4. The method as recited in claim 1, wherein the second end of said die and the second end of said tip are flush with one another at said junction.

5. The method as recited in claim 1, wherein the second end of said die and the second end of said tip are not flush with one another at their exit junction.

6. The method as recited in claim 1, wherein the jacketing compound comprises polyethylene.

7. The method as recited in claim 1, wherein the jacketing compound comprises polyvinyl chloride.

8. The method as recited in claim 1, wherein step (e) comprises supplying the jacketing compound at a pressure not exceeding 2,000 psi.

9. The method as recited in claim 1, wherein the quenching medium is at a temperature of 70° F.–80° F.

10. The method as recited in claim 1, wherein the quenching medium is at a temperature of 120° F.–130° F.

11. The medium as recited in claim 1, wherein step (f) comprises feeding the cable at a rate of 500 feet per minute.

* * * * *